US012749925B2

(12) United States Patent
Lee et al.

(10) Patent No.: US 12,749,925 B2
(45) Date of Patent: Sep. 29, 2026

(54) ELECTRONIC DEVICE AND METHOD FOR DETECTING FOREIGN BODY

(71) Applicant: SAMSUNG ELECTRONICS CO., LTD., Suwon-si (KR)

(72) Inventors: Sangwook Lee, Suwon-si (KR); Kyungmin Lee, Suwon-si (KR); Bohwan Choi, Suwon-si (KR); Jinsoo Choi, Suwon-si (KR); Sungbum Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/610,705

(22) Filed: Mar. 20, 2024

(65) Prior Publication Data

US 2024/0223020 A1 Jul. 4, 2024

Related U.S. Application Data

(63) Continuation of application No. PCT/KR2022/014289, filed on Sep. 23, 2022.

(30) Foreign Application Priority Data

Sep. 24, 2021 (KR) ........................ 10-2021-0126306

(51) Int. Cl.
*H02J 50/60* (2016.01)
*H02J 50/12* (2016.01)
*H02J 50/80* (2016.01)

(52) U.S. Cl.
CPC .............. *H02J 50/60* (2016.02); *H02J 50/12* (2016.02); *H02J 50/80* (2016.02)

(58) Field of Classification Search
CPC .......... H02J 7/025; H02J 17/00; H02N 2/008; B60L 5/005; B60L 11/182;
(Continued)

(56) References Cited

U.S. PATENT DOCUMENTS 12,302,479 B2 * 5/2025 Lee ........................ H05B 6/065
2012/0205988 A1 * 8/2012 Tanabe ...................... H02J 7/61 307/104
(Continued)

FOREIGN PATENT DOCUMENTS

CN 111384787 A 7/2020
CN 111775739 A 10/2020
(Continued)

OTHER PUBLICATIONS

Extended European Search Report dated Mar. 25, 2025 issued in European Patent Application No. 22873217.8.
(Continued)

*Primary Examiner* — Rexford N Barnie
*Assistant Examiner* — Joshua James Sweet
(74) *Attorney, Agent, or Firm* — Nixon & Vanderhye P.C.

(57) ABSTRACT

The disclosure relates to an electronic device and a method for detecting a foreign body, wherein a control circuit of the electronic device may be configured to: supply transmission power to a power transmission circuit; identify, on the basis of a low power wireless communication signal, whether an external device is present in a partial area of the externally exposed surface of the electronic device, which corresponds to a resonant circuit; on the basis of the presence of the external device, apply a high frequency current to the resonant circuit and transmit transmission power generated in the resonant circuit to the external device; obtain analog digital converter samples in a half-wave rectified direct current interval of a direct current link voltage corresponding to a transmission current detected in the power transmission circuit; and detect a foreign body on the basis of the analog digital converter samples.

15 Claims, 7 Drawing Sheets

(58) Field of Classification Search

CPC .............. B60L 11/1829; B60L 11/1831; B60L 53/12–126; Y02T 90/122; H01F 27/006; H01F 27/02; H01F 38/14; H01F 2038/143–146; H01R 13/6633; A61B 1/00029; A61N 1/3787

USPC ........................................... 307/104; 320/108

See application file for complete search history.

(56) References Cited

U.S. PATENT DOCUMENTS

| | | | | |
|---|---|---|---|---|
| 2017/0141604 | A1 | 5/2017 | Park | |
| 2017/0163100 | A1 | 6/2017 | Vocke | |
| 2018/0138756 | A1 | 5/2018 | Bae | |
| 2020/0045781 | A1 | 2/2020 | Tadla | |
| 2021/0167637 | A1 | 6/2021 | Schwartz | |
| 2021/0274604 | A1* | 9/2021 | Lee ......................... | H02J 50/60 |
| 2021/0298136 | A1 | 9/2021 | Kim et al. | |
| 2022/0394825 | A1 | 12/2022 | Park | |

FOREIGN PATENT DOCUMENTS

| | | | |
|---|---|---|---|
| EP | 2797384 | | 10/2014 |
| JP | 2011150827 | A | 8/2011 |
| KR | 20160011143 | A | 1/2016 |
| KR | 20160143044 | A | 12/2016 |
| KR | 20170018454 | A | 2/2017 |
| KR | 101860490 | B1 | 5/2018 |
| KR | 20200032469 | A | 3/2020 |
| KR | 20210054357 | A | 5/2021 |
| KR | 20210109249 | A | 9/2021 |
| WO | WO 2004/107819 | A1 | 12/2004 |

OTHER PUBLICATIONS

International Search Report for PCT/KR2022/014289 mailed Jan. 9, 2023, 6 pages.

Written Opinion of the ISA for PCT/KR2022/014289 mailed Jan. 9, 2023, 7 pages.

Korean Decision on Grant dated Jun. 22, 2026 for KR Application No. 10-2021-0126306.

* cited by examiner

ELECTRONIC DEVICE AND METHOD FOR DETECTING FOREIGN BODY

CROSS-REFERENCE TO RELATED APPLICATIONS

This application is a continuation of International Application No. PCT/KR2022/014289 designating the United States, filed on Sep. 23, 2022, in the Korean Intellectual Property Receiving Office and claiming priority to Korean Patent Application No. 10-2021-0126306, filed on Sep. 24, 2021, in the Korean Intellectual Property Office, the disclosures of each of which are incorporated by reference herein in their entireties.

BACKGROUND

Field

The disclosure relates to an electronic device and method for detecting foreign objects in an induction system.

Description of Related Art

Recently, electronic devices are developing into various forms for user convenience, and home appliances are also developing into safe and convenient forms.

Among home appliances, there is an induction system as a heating cooker, and in the induction system, an electronic device that is a heating cooker may operate in an electromagnetic induction method in which a high-frequency alternating current flows through a coil, generating a magnetic field in the coil, and heating a magnetic substance placed on the induction coil. Because electronic devices heat only the inside of the small object of the magnetic substance, their thermal efficiency is high and cooking time may be shortened, and they have recently been widely used compared to gas ranges and highlighting methods in terms of safety, thermal efficiency, and heating speed.

When a user carelessly places a metal foreign object that generates heat, such as scissors or a knife, on an induction coil, the electronic device, which is a heating cooker in an induction system, may recognize the foreign object as a container and cause heating.

In an electronic device that is a heating cooker, an inverter provides high-frequency current through an induction coil, so foreign objects may cause malfunction or overload of the inverter due to the foreign objects, resulting in overcurrent.

SUMMARY

Embodiments of the disclosure may provide an electronic device and method for detecting foreign objects when transmitting transmission power from an induction system to an external device.

According to an example embodiment of the disclosure, an electronic device may include: a communication module comprising communication circuitry configured to communicate with an external device using a low-power wireless communication method, a power transmission circuit including a resonance circuit, and a control circuit electrically connected to the power transmission circuit and the communication module, wherein the control circuit may be configured to: supply transmission power to the power transmission circuit, identify whether the external device is present in a partial area of an externally exposed surface of the electronic device corresponding to the resonance circuit, based on a low-power wireless communication signal, transmit the transmission power generated in the resonance circuit to the external device by applying a high-frequency current to the resonance circuit, based on the external device being present in the partial area of the exposed surface, obtain analog-to-digital converter samples in a half-wave rectified DC section of a DC link voltage corresponding to the transmission current detected in the power transmission circuit, and detect a foreign object based on the analog-to-digital converter samples.

According to an example embodiment, a method of operating an electronic device may include: supplying transmission power to a power transmission circuit of the electronic device, identifying whether an external device is present in a partial area of an externally exposed surface of the electronic device corresponding to a resonance circuit included in the power transmission circuit, based on a low-power wireless communication signal, transmitting the transmission power generated in the resonance circuit to the external device by applying a high-frequency current to the resonance circuit, based on the external device being present in the partial area of the exposed surface, obtaining analog-to-digital converter samples in a half-wave rectified DC section of a DC link voltage corresponding to the transmission current detected in the power transmission circuit, and detecting a foreign object based on the analog-to-digital converter samples.

According to an example embodiment, in a non-transitory computer-readable storage medium for storing a program, the program may include executable instructions, which, when executed by at least one processor of an electronic device, cause the electronic device to perform operations comprising: supplying transmission power to a power transmission circuit of the electronic device, identifying whether an external device is present in a partial area of an externally exposed surface of the electronic device corresponding to a resonance circuit included in the power transmission circuit, based on a low-power wireless communication signal, transmitting transmission power generated in the resonance circuit to the external device by applying a high-frequency current to the resonance circuit, based on the external device being present in the partial area of the exposed surface, obtaining analog-to-digital converter samples in a half-wave rectified DC section of a DC link voltage corresponding to the transmission current detected in the power transmission circuit, and detecting a foreign object based on the analog-to-digital converter samples.

According to an example embodiment, it is possible to prevent and/or reduce overcurrent from occurring due to malfunction or overload caused by foreign objects by the electronic device identifying the presence or absence of an external device on the externally exposed surface based on a low-power wireless communication signal, and by detecting foreign objects based on analog-to-digital converter samples obtained in the half-wave rectified DC section of the DC link voltage when the electronic device transmits transmission power to the external electronic device, and failures due to the overcurrent may be prevented/reduced.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In relation to the description of the drawings, identical or similar reference numerals may be used for identical or similar components.

DETAILED DESCRIPTION

Hereinafter, an electronic device according to an example embodiment is described in greater detail with reference to the attached drawings. The term user used in the disclosure may refer to a person using an electronic device or a device (e.g., an artificial intelligence electronic device) using the electronic device.

Figure 1:
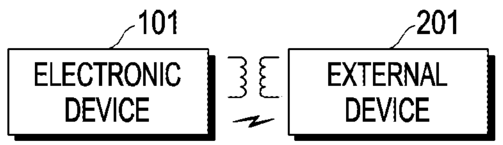
FIG. 1 is a block diagram illustrating an example configuration of an induction system according to an embodiment.
Figure 2:
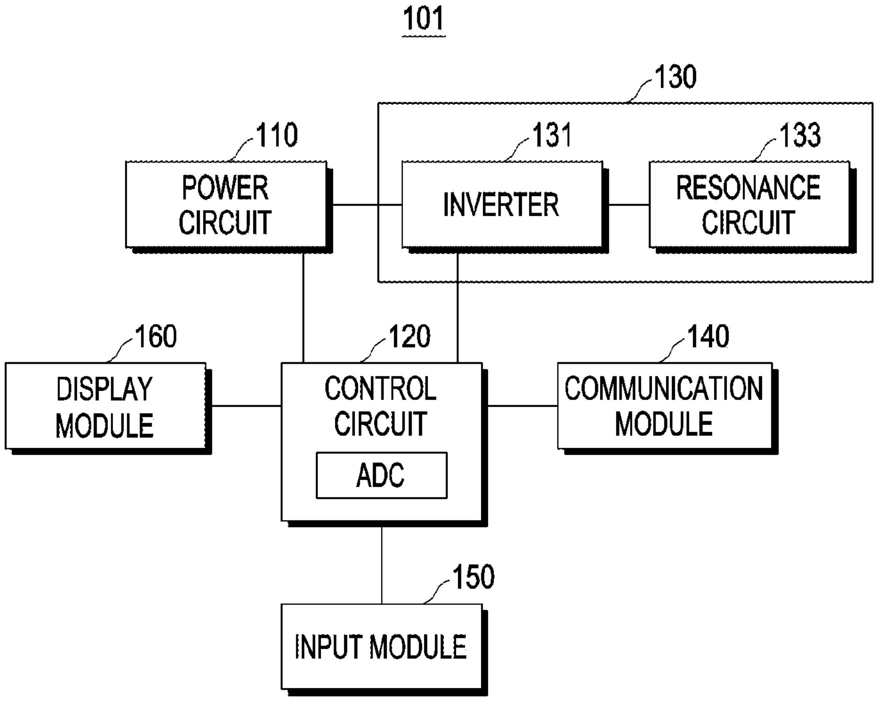
FIG. 2 is a block diagram illustrating an example configuration of an electronic device of an induction system according to an embodiment.

FIG. 1 is a block diagram illustrating an example configuration of an induction system according to an embodiment, and FIG. 2 is a block diagram illustrating an example of the configuration of an electronic device of an induction system according to an embodiment.

Referring to FIG. 1, the induction system according to an embodiment may include an electronic device 101, which includes a transmission device that transmits inductive transmission power by electromagnetic induction, and an external device 201, which includes a reception device that receives inductive reception power and is heated. The electronic device 101 may, for example, be a heating cooker, and the external device 201 may, for example, be a small object that transmits and receives a small amount of data to and from the electronic device 101. The small object may, for example, and without limitation, include an IoT device that transmits and receives a small amount of data using a low-power wireless communication method (e.g., Wife, BLE (Bluetooth low energy), Z-wave, or Zigbee).

According to an embodiment, the electronic device 101 may include a power circuit 110, a control circuit 120, a power transmission circuit 130, a communication module (e.g., including communication circuitry) 140, an input module (e.g., including input circuitry) 150, and a display module (e.g., including a display) 160. Without being limited thereto, the electronic device 101 may further include at least one of an audio output module (not illustrated), a sensor module (not illustrated), or a memory (not illustrated), each of which may include various circuitry.

According to an embodiment, the power circuit 110 of the electronic device 101 may be configured to receive power from an external power supply (not illustrated), convert the power into a required voltage for each component (e.g., the control circuit 120, the power transmission circuit 130, the communication module 140, the display module 160 and the input module 150 of FIG. 2, or other components), and apply the converted required voltage to each component.

According to an embodiment, the control circuit 120 of the electronic device 101 may include at least one processor comprising processing circuitry. For example, the control circuit 120 may include a microcontroller unit (MCU) that combines a microprocessor and an input/output module into one chip, enabling various 'control' or 'calculating operations' through a programming. The control circuit 120 may include a signal conversion circuit connected to at least one processor. The at least one processor according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

According to an embodiment, the control circuit 120 of the electronic device 101 may include a foreign object detection circuit (not illustrated) that detects voltage (or current) applied to a coil (e.g., foreign object detection (FOD) coil) (not illustrated) for detecting a foreign object included in the power transmission circuit 130, and an analog-to-digital converter (hereinafter referred to as ADC) (not illustrated) that measures analog-to-digital converter samples over time by converting the analog signal of the detected voltage into a digital signal. For example, the foreign object detection circuit may be included in the transmission power circuit 130 or may be configured as a separate circuit connected to the control circuit 120 and the transmission power circuit 130. The foreign object may refer, for example, to an object or device that may generate overvoltage or overcurrent, such as metal or aluminum, rather than an induction-only device that includes a resonance circuit for electromagnetic induction heating.

According to an embodiment, when an input for transmitting power supply (Tx ON) is received by the user input interface through an input module (e.g., the input module 150 in FIG. 2), the control circuit 120 of the electronic device 101 may apply power to the power transmission circuit (e.g., the power transmission circuit 130 of FIG. 2) to switch to an operating state, and control the power transmission circuit to remain on standby until an external device (e.g., the external device 201 of FIG. 1) is identified.

According to an embodiment, the control circuit 120 may control the communication module 140 to generate a low-power wireless communication signal (e.g., a power beacon) to identify that an external device exists using a low-power wireless communication method (e.g., Bluetooth low energy). The control circuit 120 may generate a low-power wireless communication signal (e.g., a power beacon) to identify whether the external device 201 is present (e.g., exists) in a partial area of the externally exposed surface corresponding to the area where the resonance circuit 133 is disposed. As the external device 201 that receives the low-power wireless communication signal operates, the electronic device 101 may perform an electromagnetic induction heating operation by applying a high-frequency current applied to the resonance circuit 133 to a coil included in the resonance circuit 133 to generate an electromagnetic field. The control circuit 120 may identify that the external device 201 is present in a partial area of the exposed surface by detecting a change in load.

According to an embodiment, the control circuit 120 may calculate the voltage change over time (dv/dt) (e.g., change in average value of ADC samples) in the half-wave rectified DC section (e.g., 8.3 ms section based on 60 Hz) of the direct current (hereinafter referred to as DC) link voltage based on the ADC samples obtained by the ADC. If the calculated voltage change is greater than a specified threshold, the control circuit 120 may identify that a foreign object is input and cut off the transmission power (Tx power off) applied to the power transmission circuit. When identifying that an external device 201 is present or exists in a partial area of the exposed surface of the electronic device 101, the control circuit 120 may identify the identified external device 201 as a foreign object detected in a partial area of the externally exposed surface of the electronic device 101. If the calculated voltage change is less than or equal to the specified threshold, the control circuit 120 may identify that the foreign object is removed and supply transmission power to the power transmission circuit 130 again (TX power ON). The DC link voltage may refer, for example, to the DC circuit voltage between the AC/DC converter and the inverter (e.g., DC/AC inverter) 131, and may refer, for example, to the DC stage voltage. Operations that calculate the voltage change over time (dv/dt) in the half-wave rectified DC section of the DC link voltage (e.g., 8.3 ms) and detect a foreign object based on the calculated voltage change may be performed by a foreign object detection circuit (not illustrated) included in the control circuit 120 or separately connected.

According to an embodiment, the control circuit 120 may identify that no foreign object is detected if the amount of change in DC voltage is not greater than the specified threshold. The control circuit 120 may control the communication module 140 to perform a communication connection with the external device 201 using a low-power wireless communication method, and control the communication module 140 to transmit or receive information for a power control operation according to the operation of the external device 201. If the communication connection with the external device 201 fails, the control circuit 120 may control the communication module 140 to retry the communication connection, and if the communication connection fails more than the specified number of times (N), the control circuit 120 may identify the external device 201 as a foreign object and cut off the transmission power applied to the power transmission circuit 130 (Tx power OFF).

According to an embodiment, the control circuit 120 may calculate the voltage change over time (dv/dt) in the half-wave rectified DC section and identify whether the load of the power transmission circuit 130 changes. If a load change is detected in the half-wave rectified DC section 610, the control circuit 120 may stop the DC voltage change detection operation for detecting foreign objects. If the load change is continuously detected until the reception voltage of the external device 201 is stabilized, for example, if it is identified that there is no load change or a small value change is maintained in the half-wave rectified DC section 620, the control circuit 120 may restart the DC voltage change detection operation. The electronic device 101 is connected to communication with the external device 201 and may periodically receive feedback information including reception voltage stabilization information from the external device 201.

According to an embodiment, the power transmission circuit 130 of the electronic device 101 may include an inverter 131 and a resonance circuit 133 including a coil (e.g., induction coil). The inverter 131 may be connected to the signal conversion circuit of the control circuit 120 and convert a DC voltage to an alternating current voltage. The inverter 131 may apply a high-frequency current corresponding to a frequency (f) configured or changed for transmission power control under the control of the control circuit 120 to the resonance circuit 133. When a high-frequency current is applied to the coil of the resonance circuit 133 and the external device 201 including a reception induction coil exists in a partial area of the exposed surface of the electronic device 101, the resonance circuit 133 may be configured to generate an electromagnetic field to the external device 201 by an electromagnetic induction method. The power transmission circuit 130 may include a foreign object detection coil (e.g., an FOD coil) (not illustrated). The voltage or current applied to the foreign object detection coil may be detected by the control circuit 120 to detect the foreign object.

According to an embodiment, the communication module 140 of the electronic device 101 may include various communication circuitry and generate a low-power wireless communication signal (e.g., a beacon signal) to identify whether the external device 201 exists on the exposed surface of the electronic device 101 using a low-power wireless communication method (e.g., BLE). The communication module 140 may establish a connection with the external device 201 using a low-power wireless communication method (e.g., BLE) to transmit/receive feedback information for controlling or adjusting transmission power according to the operation (or small object operation) of the connected external device 201.

According to an embodiment, the input module 150 of the electronic device 101 may include various input circuitry and receive user input related to operating functions of the electronic device 101 and transmit the received user input to the control circuit 120. The input module 150 may include menus (e.g., buttons or input interfaces) related to provided functions. Commands or data to be used for components (e.g., the control circuit 120) of the electronic device 101 may be received from outside (e.g., a user) the electronic device 101.

According to an embodiment, the display module 160 of the electronic device 101 may include a display and display objects representing menus (e.g., buttons or input interfaces) related to provided functions. The display module 160 may be disposed in a partial area of the exposed surface of the electronic device 101. The partial areas are different from the area where the resonance circuit 133 is disposed. When a foreign object is detected by the control circuit 120, the display module 160 may display notification information related to detection or removal of the foreign object or notification information for cutting off the transmission power. The display module 160 may display information according to the performance of functions provided by the electronic device 101. The display module 160 may visually provide information to the outside (e.g., a user) of the electronic device 101. The display module 160 may include, for example, a display, a hologram device, or a projector, and a control circuit for controlling the corresponding device. According to an embodiment, the display module 160 may include a touch sensor configured to detect a touch, or a pressure sensor configured to measure the intensity of force generated by the touch.

According to an embodiment, the audio output module (not illustrated) of the electronic device 101 may output an audio signal to the outside of the electronic device 101. When a foreign object is detected by the control circuit 120, the audio output module may output notification information related to detection or removal of the foreign object or notification information for cutting off transmission power as an audio signal. The audio output module may output information according to the performance of functions provided by the electronic device 101 as audio signals. The audio output module may include, for example, a speaker or receiver. The speaker may be used for general purposes such as multimedia playback or recording playback. The receiver may be used to receive incoming calls. According to an embodiment, the receiver may be implemented separately from a speaker or as part of the speaker.

According to an embodiment, the audio module (not illustrated) of the electronic device 101 may convert sound into an electrical signal or, conversely, may convert an electrical signal into sound. According to an embodiment, the audio module may obtain sound through the input module 150 or output sound through an audio output module or an external electronic device (e.g., a speaker or headphone) connected directly or wirelessly to the electronic device 101.

According to an embodiment, the sensor module (not illustrated) of the electronic device 101 may detect the operating state (e.g., power or temperature) of the electronic device 101 or the external environmental state (e.g., user state) and generate an electrical signal or data value corresponding to the detected state. According to an embodiment, the sensor module may include, for example, a gesture sensor, a gyro sensor, an air pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

According to an embodiment, a haptic module (not illustrated) of the electronic device 101 may convert electrical signals into mechanical stimulation (e.g., vibrations or movements) or electrical stimulation that the user may perceive through tactile or kinesthetic senses. According to an embodiment, the haptic module 179 may include, for example, a motor, a piezoelectric element, or an electrical stimulation device.

According to an embodiment, the memory of the electronic device 101 may store various data used by at least one component (e.g., a processor or sensor module) of the electronic device 101. Data may include, for example, software (e.g., input data or output data for programs and instructions associated therewith). The memory may include a volatile memory or non-volatile memory. Programs may be stored in the memory as software and may include, for example, an operating system, middleware, or applications.

According to an embodiment, at least one processor included in the control circuit 120 may, for example, execute software (e.g., a program) to control at least one other component (e.g., a hardware or software component) of an electronic device connected to the processor and perform various data processing or calculations. According to an embodiment, as at least part of data processing or calculation, the processor may store commands or data received from other components (e.g., a sensor module or the communication module 140) in a volatile memory, process the commands or data stored in the volatile memory, and store the resulting data in a non-volatile memory. According to an embodiment, the processor may include a main processor (e.g., central processing unit or application processor) or an auxiliary processor (e.g., a graphics processing unit, a neural processing unit (NPU), an image signal processor, a sensor hub processor, or a communication processor) that may operate independently or together. For example, when the electronic device 101 includes the main processor and auxiliary processor, the auxiliary processor may be configured to use less power than the main processor or to specialize in specified functions. The auxiliary processor may be implemented separately from the main processor or as part of the main processor.

As described above, in an embodiment, various components of the electronic device have been described through the electronic device 101 of FIGS. 1 and 2. However, in various embodiments, not all of the components illustrated in FIGS. 1 and 2 are essential components, and the electronic device 101 may be implemented by more components than the illustrated components, or the electronic device 101 may be implemented by fewer components. In addition, the location of the main components of the electronic device 101 described above through FIGS. 1 and 2 may be changed according to various embodiments.

According to an embodiment, an electronic device (e.g., the electronic device 101 of FIGS. 1 and 2) may include: a communication module (e.g., the communication module 140 of FIG. 2) comprising communication circuitry configured to communicate with an external device using a low-power wireless communication method, a power transmission circuit (e.g., the power transmission circuit 130 of FIG. 2) including a resonance circuit (e.g., the resonance circuit 133 of FIG. 2), and a control circuit (e.g., the control circuit 120 of FIG. 2) electrically connected to the power transmission circuit and the communication module, wherein the control circuit may be configured to: supply transmission power to the power transmission circuit, identify whether the external device is present in a partial area of an externally exposed surface of the electronic device corresponding to the resonance circuit, based on a low-power wireless communication signal, transmit the transmission power generated in the resonance circuit to the external device by applying a high-frequency current to the resonance circuit, based on the external device being present in the partial area of the exposed surface, obtain analog-to-digital converter samples in a half-wave rectified DC section of a DC link voltage corresponding to the transmission current detected in the power transmission circuit, and detect a foreign object based on the analog-to-digital converter samples.

According to an example embodiment, the control circuit may be configured to: detect the amount of change in DC voltage based on the analog-to-digital converter samples in the half-wave rectified DC section, identify that the foreign object is detected in the partial area of the exposed surface based on the amount of change in DC voltage being greater than the specified threshold, and cut off the transmission power applied to the power transmission circuit.

According to an example embodiment, the control circuit may be configured to identify the external device as the detected foreign object based on the external device being present in the partial area of the exposed surface.

According to an example embodiment, the control circuit may be configured to: identify that the foreign object is present in the partial area of the exposed surface is removed based on the amount of change in DC voltage being less than or equal to the specified threshold, and apply the transmission power to the power transmission circuit.

According to an example embodiment, the control circuit may be configured to: identify that the external device is present in the partial area of the exposed surface based on a change in load of the power transmission circuit being detected, and control the communication module to perform a communication connection with the external device using the low-power wireless communication method.

According to an example embodiment, the control circuit may be configured to: control the communication module to re-perform the communication connection with the external device based on the communication connection with the external device failing less than or equal to a specified number of times, identify the external device as the foreign object based on the communication connection with the external device failing more than the specified number of times, and cut off the transmission power.

According to an example embodiment, the control circuit may be configured to: stop detecting the amount of change in DC voltage for detecting the foreign object based on a change in load of the power transmission circuit being detected, receive feedback information including stabilization information of the reception voltage of the external device periodically using the low-power wireless communication method by the communication module, identify stabilization of the reception voltage of the external electronic device based on the feedback information, and based on the load change being detected, and re-detect the amount of change in DC voltage for detecting the foreign object, and the amount of change in DC voltage may be detected based on the analog-to-digital converter samples in the half-wave rectified DC section.

According to an example embodiment, the electronic device may further comprise: a display module, comprising a display, electrically connected to the control circuit and an audio output module comprising circuitry electrically connected to the control circuit, wherein the control circuit may be configured to: control the display module to display notification information related to detection or removal of the foreign object based on the foreign object being detected in the partial area of the exposed surface, and control the audio output module to output notification information related to the detection or removal of the foreign object as an audio signal based on the foreign object being detected in the partial area of the exposed surface.

According to an example embodiment, the control circuit may be configured to: control the communication module to transmit notification information related to detection or removal of the foreign object to another electronic device based on the foreign object being detected in the partial area of the exposed surface, receive information related to the operation of the external device, and control the transmission power based on the information related to the operation of the external device, wherein the low-power wireless communication method may be Bluetooth communication, and the low-power wireless communication signal may be a beacon signal of the Bluetooth communication.

Hereinafter, the operating method of the electronic device described with reference to FIGS. 1 and 2 will be described in greater detail below with reference to the drawings.

Figure 3:
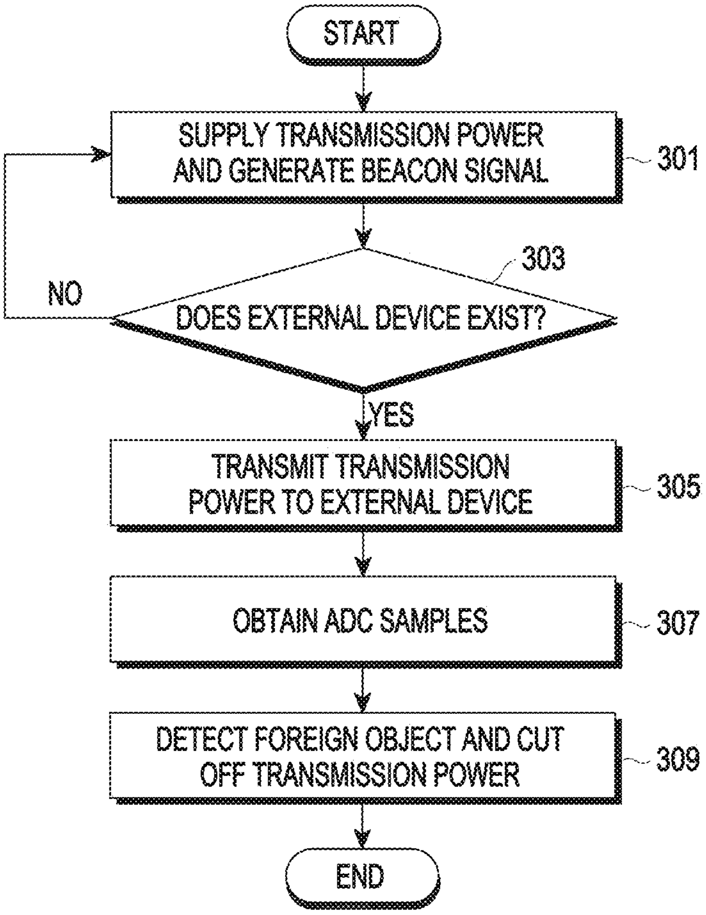
FIG. 3 is a flowchart illustrating an example of an operation method of operating an electronic device according to an embodiment.

FIG. 3 is a flowchart illustrating an example method of operating an electronic device according to an embodiment.

Referring to FIG. 3, when power provided from the power supply device (e.g., commercial power or battery) is supplied, the electronic device (e.g., the electronic device 101 of FIGS. 1 and 2) according to an embodiment may convert the supplied power into the voltage required by each component (e.g., the control circuit 120, the power transmission circuit 130, the communication module 140, the display module 160 and the input module 150 of FIG. 2, or other components) for driving the electronic device and apply the converted voltage to each component.

In operation 301, the electronic device may supply transmission power (Tx power on) to a power transmission circuit (e.g., the power transmission circuit 130 of FIG. 2) that generates transmission power for heating an external device (e.g., the external device 201 of FIG. 1) by induction heating. The electronic device may generate a low-power wireless communication signal when transmission power is supplied. For example, the low-power wireless communication signal may be a beacon signal transmitted periodically using a low-power wireless communication method (e.g., BLE). When the beacon signal is generated, an external device located adjacent to the electronic device 101 may receive the beacon signal, and low-power wireless communication (e.g., ble) of the external device may be activated (on).

In operation 303, the electronic device may identify whether an external device is present or exists in a partial area of the externally exposed surface of the electronic device corresponding to the resonance circuit based on the low-power wireless communication signal. As a result, if there is an external device, the electronic device may perform operation 305, and if there is no external device, operation 301 may be performed again.

In operation 305, if the external device is identified as being present, the electronic device may apply a high-frequency current to the resonance circuit to transmit transmission power generated in the resonance circuit to the external device. If the external device is a device including a coil rather than a foreign object, a current is induced in the coil and the device may receive power and operate. The electronic device may identify that an external device is present based on a change in the load of the power transmission circuit, and in operation 305, the electronic device may establish a communication connection with the identified external device using a low-power wireless communication method. For example, the communication connection may not be performed in operation 305, but may be performed after the foreign object detection operation (operation 309) is performed.

In operation 307, the electronic device may obtain analog-to-digital converter (ADC) samples in the half-wave rectified DC section of the DC link voltage corresponding to the transmission current detected in the power transmission circuit.

In operation 309, the electronic device may detect the foreign object based on the analog-to-digital converter samples to detect the foreign object. If a foreign object is detected, the electronic device may cut off the transmission power. If no foreign object is detected, the electronic device may continue to perform operations (operations 307 and 308) for detecting a foreign object in the half-wave rectified DC section corresponding to the FO detection timing section (8.3 ms) of the next time section. Foreign object detection operations may be performed repeatedly until the transmission power is cut off.

Figure 4:
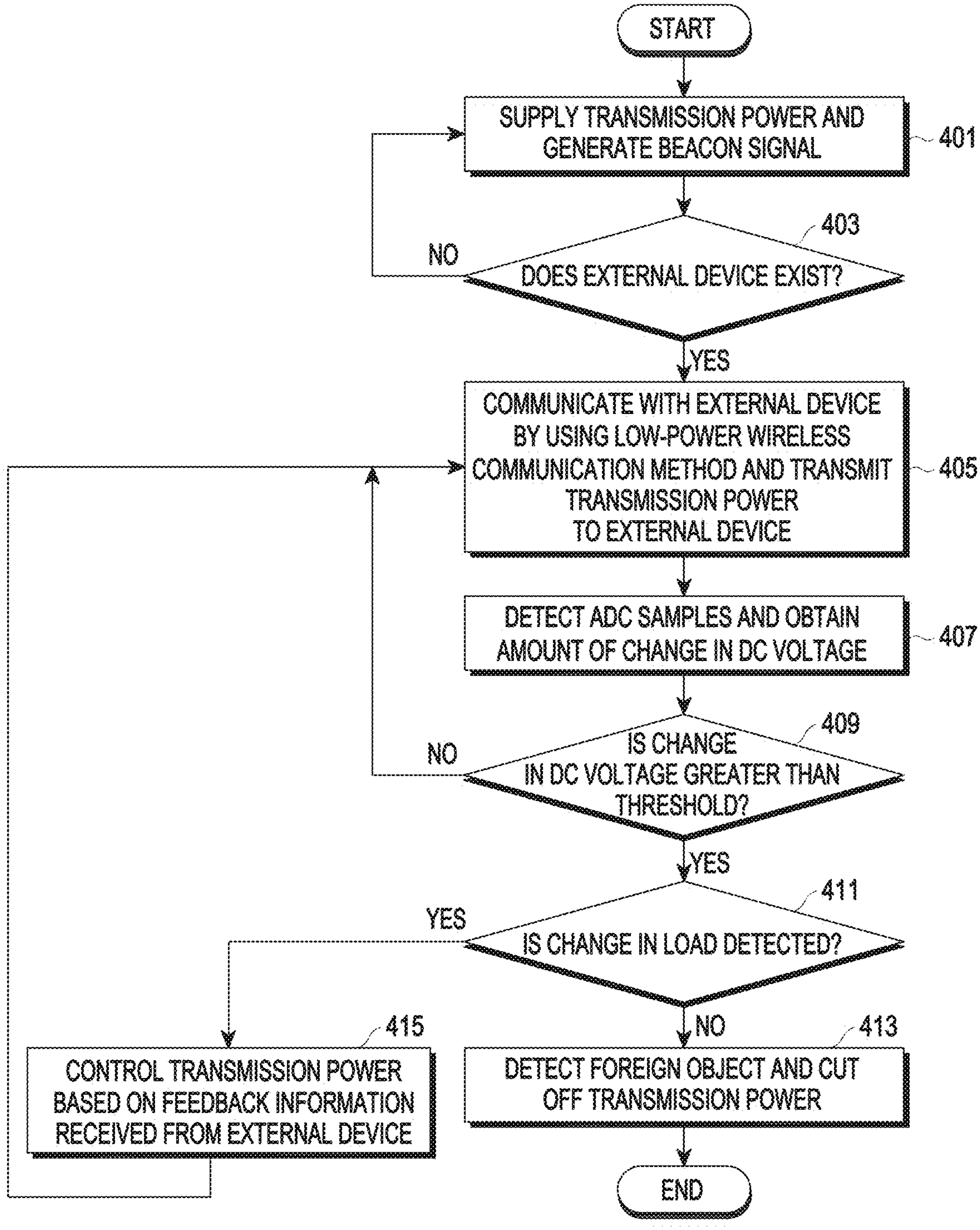
FIG. 4 is a flowchart illustrating an example method of operating an electronic device according to an embodiment.
Figure 5:
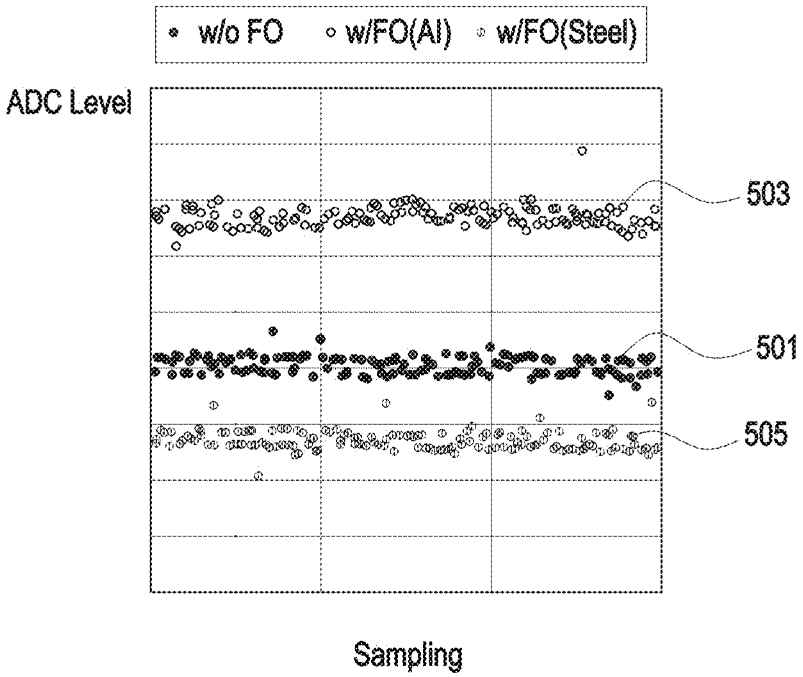
FIG. 5 is a graph illustrating an example of analog-to-digital converter samples by an operation method in an electronic device according to an embodiment.
Figure 6:
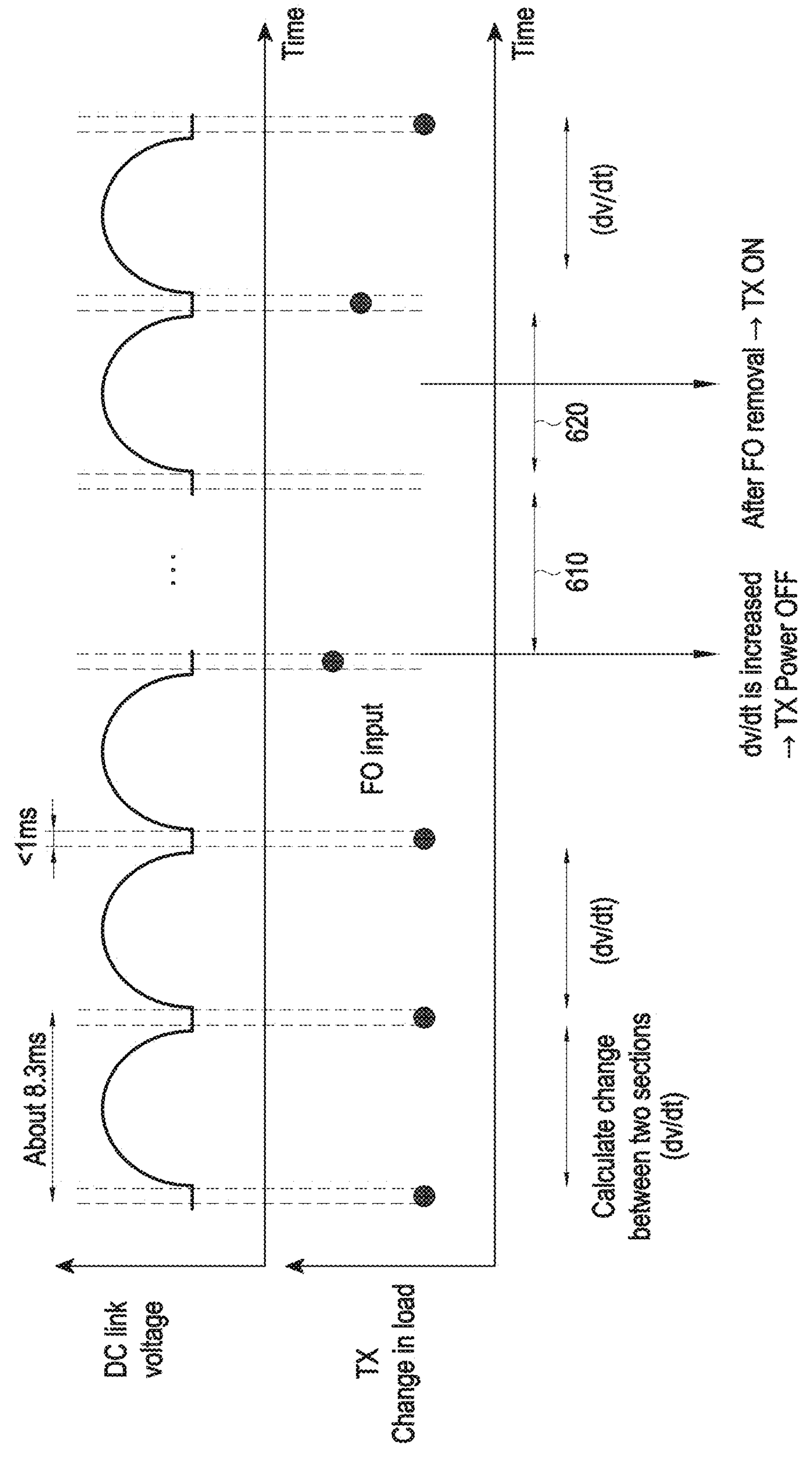
FIG. 6 is a graph illustrating an example of detecting a foreign object by detecting a voltage change in a half-wave rectified DC section of a DC link voltage by an operation method in an electronic device according to an embodiment.
Figure 7:
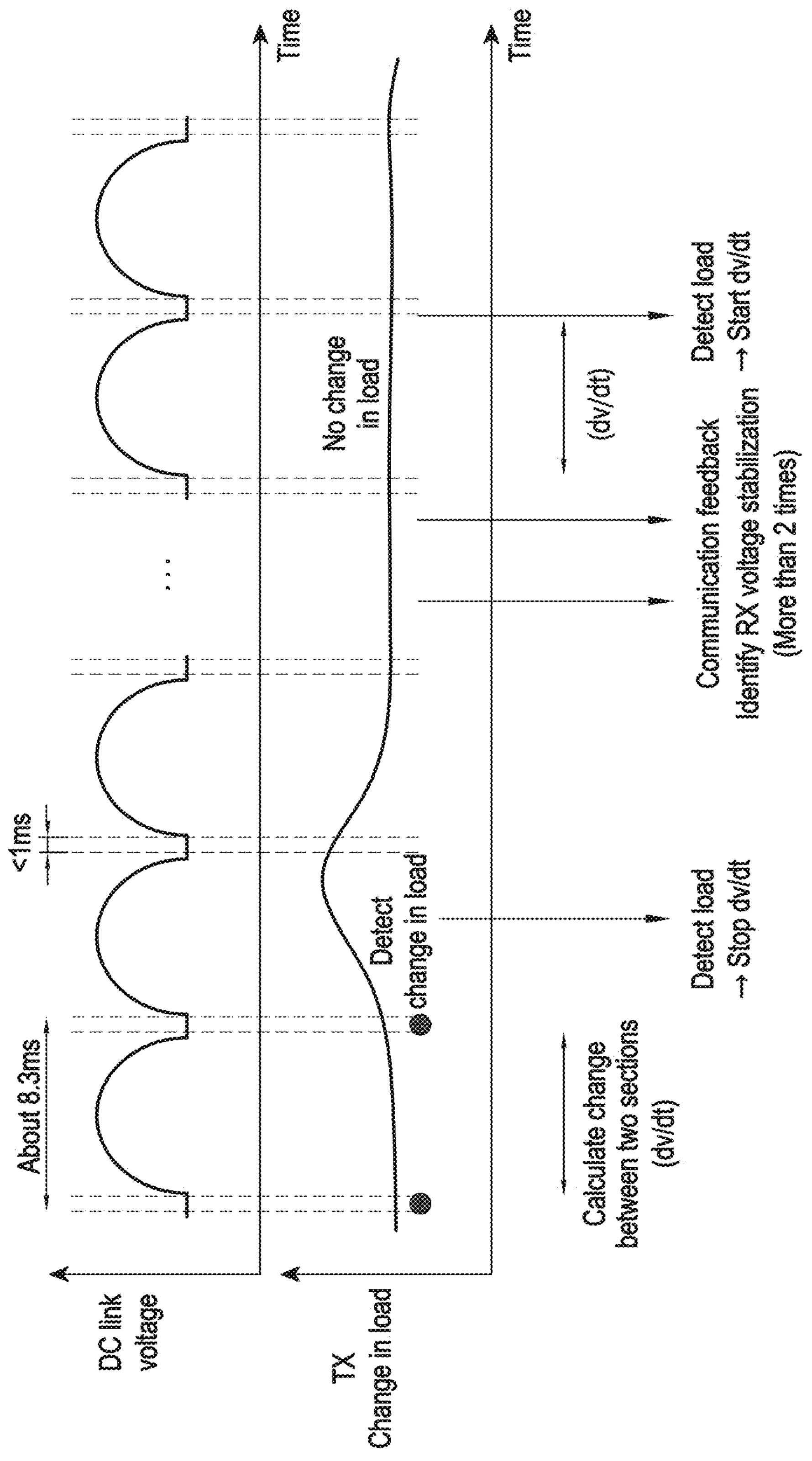
FIG. 7 is a graph illustrating an example of detecting a foreign object by detecting a load change in a half-wave rectified DC section of a DC link voltage by an operation method in an electronic device according to an embodiment.

FIG. 4 is a flowchart illustrating an example method of operating an electronic device according to an embodiment, FIG. 5 is a graph illustrating an example of analog-to-digital converter samples by an operation method in an electronic device according to an embodiment, FIG. 6 is a graph illustrating an example of detecting a foreign object by detecting a voltage change in a half-wave rectified DC section of a DC link voltage by an operation method in an electronic device according to an embodiment, and FIG. 7 is a graph illustrating an example of detecting a foreign object by detecting a load change in a half-wave rectified DC section of a DC link voltage by an operation method in an electronic device according to an embodiment.

Referring to FIG. 4, in operation 401, when an input for transmission power supply (Tx power ON) is received by the user input interface through an input module (e.g., the input module 150 of FIG. 2), the electronic device (e.g., the electronic device 101 of FIGS. 1 and 2) according to an embodiment may supply transmission power to a power transmission circuit (e.g., the power transmission circuit 130 of FIG. 2), and maintain a standby state until an external device (e.g., the external device 201 of FIG. 1) is identified in a partial area of the externally exposed surface corresponding to the area where the resonance circuit is disposed. In operation 401, the electronic device may generate a low-power wireless communication signal (e.g., a power beacon) to identify that an external device exists using a low-power wireless communication method (e.g., Bluetooth low energy).

In operation 403, the electronic device may identify whether an external device is present on the exposed surface corresponding to the area where the resonance circuit is disposed. If the external device activates low-power wireless communication (e.g., BLE) and is located in a partial area of the exposed surface of the electronic device, the external device receiving the low-power wireless communication signal may operate based on power received when a current is induced in the resonance circuit by an electromagnetic field generated in the resonance circuit of the electronic device. As the external device operates on a partial area of the exposed surface of the electronic device, a change in the load of the power transmission circuit of the electronic device may occur. The electronic device may identify the location of the external device based on a low-power wireless communication signal and identify that the external device is present in a partial area of the exposed surface by detecting a change in load. As a result of the identification, if the external device is present, the electronic device may perform operation 405, and if no external device is present, the electronic device may perform operation 401 again.

In operation 405, based on the external device being present, the electronic device may apply a high-frequency current to the resonance circuit of the electronic device to transmit transmission power generated in the resonance circuit to the external device. In operation 405, the electronic device may establish a communication connection with the external device using a low-power wireless communication method and perform a power control operation according to the operation of the external device. When performing operation 405, if the communication connection fails, the electronic device may retry the communication connection. If the communication connection fails more than a specified number of times (N), the electronic device may identify the external device as a foreign object and cut off the power applied to the power transmission circuit (Tx power OFF).

In operation 407, the electronic device may convert and sample an analog signal corresponding to the transmission current (or voltage) detected in the power transmission circuit into a digital signal using an ADC converter to obtain measured ADC samples. The electronic device may obtain the amount of change (dv/dt) in the DC voltage calculated in the half-wave rectified DC section of the DC link voltage based on the measured ADC samples. The electronic device may obtain the ADC samples in the half-wave rectified DC section of the DC link voltage and perform a foreign object detection operation based on the ADC samples measured at the foreign object detection timing corresponding to the half-wave rectified DC section. The electronic device may obtain detection timing ADC samples for each type of the foreign object by identifying whether it is a foreign object detection timing section (e.g., 50V section) in the DC link voltage. As illustrated in FIG. 5, the measured ADC levels of ADC samples may be measured differently depending on the type of foreign object. For example, as illustrated in FIG. 5, if it is not a foreign object (w/o FO) but is a small object capable of normal small object operation (e.g., the external device 201 of FIG. 1), the electronic device may measure first ADC samples (e.g., samples of level values approximate to the 400 level) distributed as illustrated in the first graph 501. For example, as illustrated in FIG. 5, if the foreign object is made of aluminum (w/FO(Al)), the electronic device may measure second ADC samples (e.g., samples of level values approximate to the 500 level) distributed as illustrated in the second graph 503. For example, as illustrated in FIG. 5, if the foreign object is made of metal (w/FO (steel)), the electronic device may measure third ADC samples (e.g., samples of level values approximate to the 350 level) distributed as illustrated in the third graph 505.

In operation 409, the electronic device may identify whether the amount of change in DC voltage exceeds a specified threshold. As a result of identification, if the amount of change in DC voltage exceeds the specified threshold, the electronic device may perform operation 411. If the amount of change in DC voltage does not exceed the specified threshold, the electronic device may perform operation 405.

In operation 411, the electronic device may identify whether a load change is detected. As a result of identification, if the load change is detected, operation 415 may be performed, and if the load change is not detected, operation 413 may be performed.

In operation 413, when the load change is not detected, the electronic device may identify that a foreign object has been detected in a partial area of the exposed surface and cut off the transmission power applied to the power transmission circuit (Tx power OFF). For example, as illustrated in FIG. 6, as the foreign object (FO) sensing level value (e.g., voltage level values) of the average value (e.g., configured to 5% or less error range) of n samples within the section is detected as exceeding the specified threshold value of the change in DC voltage in the half-wave rectified DC section 610, the electronic device may identify that a foreign object has been input into the half-wave rectified DC section 610 and cut off the transmission power (TX power OFF). As illustrated in FIG. 6, if the foreign object sensing level value (e.g., voltage level values) of the average value (e.g., configured to 5% or less error range) of n samples within the section does not change in the half-wave rectified DC section or is an approximate change value, the electronic device may identify the section in which the foreign object is not identified and supply transmission power to the power transmission circuit (switching or maintaining Tx power on). As illustrated in FIG. 6, as the amount of change in DC voltage decreases in the half-wave rectified DC section 620, the electronic device may identify that the foreign object has been removed and re-apply the transmission power (Tx power) to the power transmission circuit.

In operation 415, as illustrated in FIG. 7, when the load change is detected, the electronic device may periodically receive feedback information including reception voltage stabilization information from the external device and control transmission power based on the feedback information. As a load change is detected, the electronic device may stop the DC voltage change detection for detecting foreign objects. Afterwards, the electronic device may perform operation 405. For example, as illustrated in FIG. 7, the electronic device may continue to detect load changes until the reception voltage of the external device stabilizes, and restart the DC voltage change detection operation when identifying no load change or maintaining a small load change value.

Figure 8:
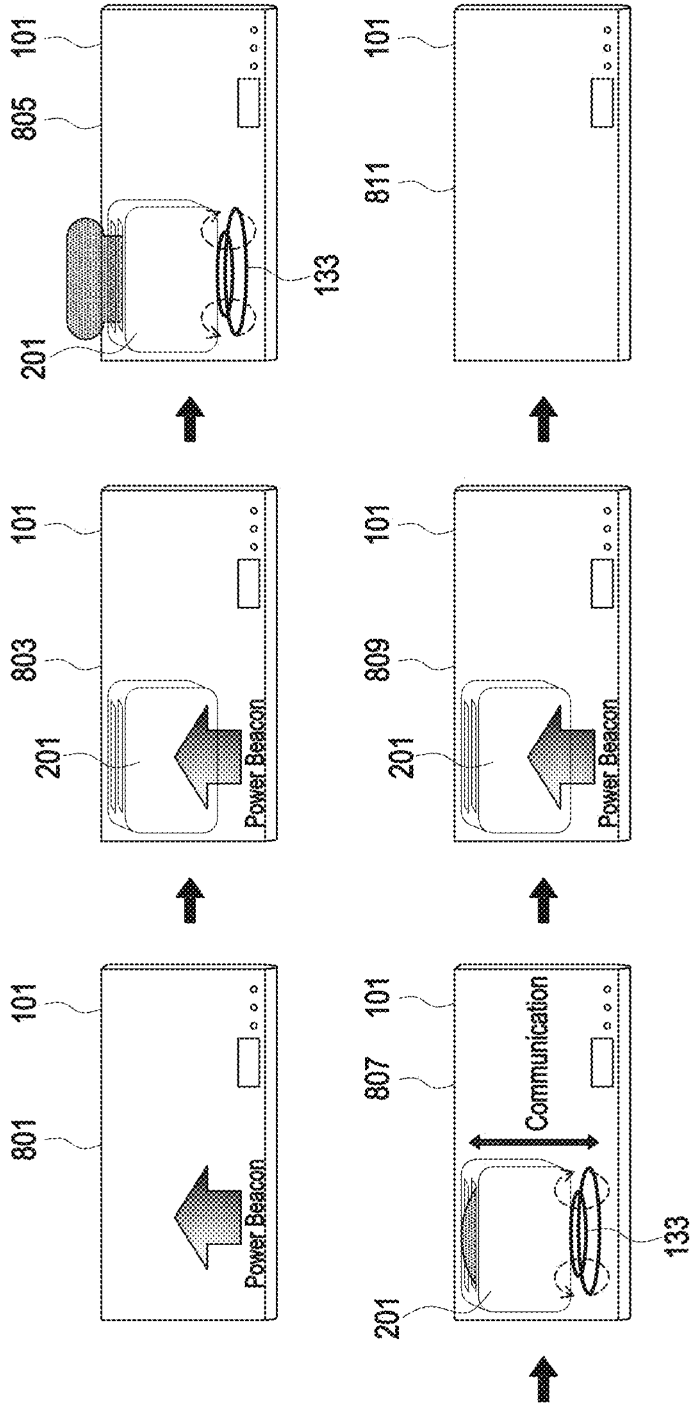
FIG. 8 is a diagram illustrating an example method of operating an electronic device according to an embodiment.

FIG. 8 is a diagram illustrating an example method of operating an electronic device according to an embodiment.

Referring to FIG. 8, in operation 801, when transmission power is applied (Tx power on), the electronic device 101 (e.g., the electronic device 101 of FIGS. 1 and 2) according to an embodiment may generate a low-power wireless communication signal (e.g., a power beacon) to identify whether an external device 201 is present in a partial area of the exposed surface corresponding to the area where the coil is disposed.

In operation 803, as the low-power wireless communication signal is received (RX BLE ON) from the external device 201 and an operation (e.g., small object operation) of the external device 201 is performed, the electronic device 101 may identify that the external device 201 is present in a partial area of the exposed surface. In this case, the electronic device 101 may detect a change in the load of the power transmission circuit and, if there is a change in the load, identify that the external device 201 exists in a partial area of the exposed surface. The electronic device may identify whether the external electronic device is a foreign object. As in operation 407 of FIG. 4, the electronic device 101 may identify whether it is a foreign object or not based on the amount of change in DC voltage.

In operation 805, the electronic device 101 may transmit/receive feedback information according to the operation (e.g., small object operation) of the communication-connected external device 201 while establishing a communication connection with the external device 201 and performing an electromagnetic induction heating operation by the resonance circuit 133. In this case, if the communication connection with the external device 201 fails more than a specified number of times, the electronic device 101 may identify the external device 201 as a foreign object and cut off the transmission power to prevent/reduce high-frequency current from being applied to the resonance circuit 133.

In operation 807, the electronic device 101 may control real-time transmission power based on feedback information transmitted or received using a low-power wireless communication method while performing an electromagnetic induction heating operation by the resonance circuit 133.

In operation 809, when the operation of the external device 201 is completed, the electronic device 101 may receive a signal indicating operation completion from the external device 201, stop transmitting power to the external device 201, and release the BLE communication connection. In operation 811, the electronic device 101 may generate a low-power wireless communication signal and then switch to a standby state or a power-off state.

According to an example embodiment, a method of operating an electronic device (e.g., the electronic device 101 of FIGS. 1 and 2) may include: supplying transmission power to a power transmission circuit (e.g., the power transmission circuit 130 of FIG. 2) of the electronic device, identifying whether an external device (e.g., the external device 201 of FIG. 1) is present in a partial area of an externally exposed surface of the electronic device corresponding to a resonance circuit (e.g., the resonance circuit 133 of FIG. 2) included in the power transmission circuit, based on a low-power wireless communication signal, transmitting the transmission power generated in the resonance circuit to the external device by applying a high-frequency current to the resonance circuit, based on the external device being present in the partial area of the exposed surface, obtaining analog-to-digital converter samples in a half-wave rectified DC section of a DC link voltage corresponding to the transmission current detected in the power transmission circuit, and detecting a foreign object based on the analog-to-digital converter samples.

According to an example embodiment, the detecting of the foreign object may include detecting the amount of change in DC voltage based on the analog-to-digital converter samples in the half-wave rectified DC section, identifying that the foreign object is detected in the partial area of the exposed surface based on the amount of change in DC voltage being greater than the specified threshold, and cutting off the transmission power applied to the power transmission circuit.

According to an example embodiment, the detecting of the foreign object may further include identifying the external device as the detected foreign object based on the external device being present in the partial area of the exposed surface.

According to an example embodiment, the detecting of the foreign object may include identifying that the foreign object present in the partial area of the exposed surface is removed based on the amount of change in DC voltage being less than or equal to the specified threshold, and applying the transmission power to the power transmission circuit.

According to an example embodiment, the identifying whether the external device exists may include identifying the external device being present in the partial area of the exposed surface based on a change in load of the power transmission circuit being detected and performing a communication connection with the external device using the low-power wireless communication method.

According to an example embodiment, the performing the communication connection may include re-performing the communication connection with the external device based on the communication connection with the external device failing less than or equal to a specified number of times, identifying the external device as the foreign object based on the communication connection with the external device failing more than the specified number of times, and cutting off the transmission power.

According to an example embodiment, the detecting of the foreign object may include stopping detection of the amount of change in DC voltage for detecting the foreign object based on a change in load of the power transmission circuit being detected, receiving feedback information including stabilization information of the reception voltage of the external device periodically using the low-power wireless communication method by the communication module, identifying stabilization of the reception voltage of the external electronic device based on the feedback information, and based on the load change being detected, re-detecting the amount of change in DC voltage for detecting the foreign object.

According to an example embodiment, the amount of change in DC voltage may be detected based on the analog-to-digital converter samples in the half-wave rectified DC section.

According to an example embodiment, the method may further include displaying notification information related to detection or removal of the foreign object to the display module of the electronic device based on the foreign object being detected in the partial area of the exposed surface.

According to an example embodiment, the method may further include outputting notification information related to the detection or removal of the foreign object as an audio signal by the audio output module of the electronic device based on the foreign object being detected in the partial area of the exposed surface.

According to an example embodiment, the method may further include controlling the communication module to transmit notification information related to detection or removal of the foreign object to another electronic device based on the foreign object being detected in the partial area of the exposed surface, receiving information related to the operation of the external device, and controlling the transmission power based on the information related to the operation of the external device, wherein the low-power wireless communication method may include Bluetooth communication, and the low-power wireless communication signal may include a beacon signal of the Bluetooth communication.

According to an example embodiment, in a non-transitory computer-readable storage medium for storing a program, the program may include executable instructions, which, when executed by at least one processor of an electronic device (e.g., the electronic device 101 of FIG. 1), cause the electronic device to perform operations comprising: supplying transmission power to a power transmission circuit (e.g., the power transmission circuit 130 of FIG. 2) of the electronic device, identifying whether an external device (e.g., the external device 201 of FIG. 1) is present in a partial area of an externally exposed surface of the electronic device corresponding to a resonance circuit (e.g., the resonance circuit 133 of FIG. 2) included in the power transmission circuit, based on a low-power wireless communication signal, transmitting transmission power generated in the resonance circuit to the external device by applying a high-frequency current to the resonance circuit, based on the external device being present in the partial area of the exposed surface, obtaining analog-to-digital converter samples in a half-wave rectified DC section of a DC link voltage corresponding to the transmission current detected in the power transmission circuit, and detecting a foreign object based on the analog-to-digital converter samples.

The embodiments disclosed herein are presented to explain the technical contents of the disclosure and aid in understanding thereof, and are not intended to limit the scope of the technology set forth herein. Therefore, the scope of the disclosure should be construed to include all changes and modifications or other embodiments based on the technical idea of the disclosure.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, a home appliance, or the like. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C" may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), the element may be coupled/connected with/to the other element directly (e.g., wiredly), wirelessly, or via a third element.

As used herein, the term "module" may include a unit implemented in hardware, software, or firmware, or any combination thereof, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

embodiments as set forth herein may be implemented as software (e.g., a program) including one or more instructions that are stored in a storage medium (e.g., a memory) that is readable by a machine (e.g., the electronic device 101). For example, a processor of the machine (e.g., the electronic device 101) may invoke at least one of the one or more stored instructions from the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the multiple entities may be separately disposed in any other element. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a communication module comprising communication circuitry configured to communicate with an external device using a low-power wireless communication method;

a power transmission circuit including a resonance circuit configured for electromagnetic induction heating;

a control circuit electrically connected to the power transmission circuit and the communication module, and configured to convert transmission power into a direct current (DC) link voltage; and an inverter configured to convert the DC link voltage into alternating current (AC) voltage and output a high-frequency current to the resonance circuit, wherein the control circuit is configured to control the electronic device to:

identify whether the external device is present in a partial area of an externally exposed surface of the electronic device corresponding to the resonance circuit, based on a low-power wireless communication signal;

transmit the transmission power generated in the resonance circuit to the external device by applying the high-frequency current to the resonance circuit, based on the external device being present in the partial area of the exposed surface;

obtain analog-to-digital converter samples in a half-wave rectified DC section of the DC link voltage; and identify that a foreign object is detected based on an average value of the analog-to-digital converter samples in the half-wave rectified DC section of the DC link voltage exceeding a specified threshold value.

2. The electronic device of claim 1, wherein the control circuit is configured to control the electronic device to:

detect an amount of change in DC voltage based on the analog-to-digital converter samples in the half-wave rectified DC section of the DC link voltage;

identify that the foreign object is detected in the partial area of the exposed surface based on the amount of change in DC voltage being greater than a specified threshold, and cut off the transmission power applied to the power transmission circuit; and identify that the foreign object present in the partial area of the exposed surface is removed based on the amount of change in DC voltage being less than or equal to the specified threshold, and apply the transmission power to the power transmission circuit.

3. The electronic device of claim 2, wherein the control circuit is configured to control the electronic device to identify the external device as the detected foreign object based on the external device being present in the partial area of the exposed surface.

4. The electronic device of claim 1, wherein the control circuit is configured to control the electronic device to:

identify that the external device is present based on a change in load of the power transmission circuit being detected; and control the communication module to perform a communication connection with the external device using the low-power wireless communication method, and wherein the control circuit is further configured to:

control the communication module to re-perform the communication connection with the external device based on the communication connection with the external device failing a specified number of times or less than the specified number of times; and identify the external device as the foreign object based on the communication connection with the external device failing more than the specified number of times, and cut off the transmission power.

5. The electronic device of claim 2, wherein the control circuit is configured to control the electronic device to:

stop detecting the amount of change in DC voltage for detecting the foreign object based on a change in load of the power transmission circuit being detected;

receive feedback information including stabilization information of a reception voltage of the external device periodically using the low-power wireless communication method by the communication module; and identify stabilization of the reception voltage of the external device based on the feedback information, and based on the load change being detected, re-detect the amount of change in DC voltage for detecting the foreign object.

6. The electronic device of claim 1, further comprising:

a display module comprising a display electrically connected to the control circuit; and an audio output module comprising audio circuitry electrically connected to the control circuit, wherein the control circuit is configured to control the electronic device to:

control the display module to display notification information related to detection or removal of the foreign object based on the foreign object being detected in the partial area of the exposed surface; and control the audio output module to output notification information related to the detection or removal of the foreign object as an audio signal based on the foreign object being detected in the partial area of the exposed surface.

7. The electronic device of claim 1, wherein the control circuit is configured to control the electronic device to:

control the communication module to transmit notification information related to detection or removal of the foreign object to another electronic device based on the foreign object being detected in the partial area of the exposed surface; and receive information related to the operation of the external device, and control the transmission power based on the information related to the operation of the external device, wherein the low-power wireless communication signal includes a beacon signal.

8. A method of operating an electronic device, the method comprising:

converting, by a control circuit of the electronic device, transmission power into a direct current (DC) link voltage;

converting, by an inverter of the electronic device, the DC link voltage into alternating current (AC) voltage and output a high-frequency current to a resonance circuit of the electronic device configured for electromagnetic induction heating;

identifying whether an external device is present in a partial area of an externally exposed surface of the electronic device corresponding to the resonance circuit included in a power transmission circuit of the electronic device, based on a low-power wireless communication signal;

transmitting the transmission power generated in the resonance circuit to the external device by applying the high-frequency current to the resonance circuit, based on the external device being present in the partial area of the exposed surface;

obtaining analog-to-digital converter samples in a half-wave rectified DC section of the DC link voltage; and identifying that a foreign object is detected based on an average value of the analog-to-digital converter samples in the half-wave rectified DC section of the DC link voltage exceeding a specified threshold value.

9. The method of claim 8, wherein the detecting of the foreign object comprises:

detecting an amount of change in DC voltage based on the analog-to-digital converter samples in the half-wave rectified DC section of the DC link voltage;

identifying that the foreign object is detected in the partial area of the exposed surface based on the amount of change in DC voltage being greater than a specified threshold, and cutting off the transmission power applied to the power transmission circuit; and identifying that the foreign object is present in the partial area of the exposed surface is removed based on the amount of change in DC voltage being less than or equal to the specified threshold, and applying the transmission power to the power transmission circuit.

10. The method of claim 9, wherein the detecting of the foreign object further comprises identifying the external device as the detected foreign object based on the external device being present.

11. The method of claim 8, wherein the identifying of whether the external device exists comprises:

identifying that the external device is present based on a change in load of the power transmission circuit being detected; and performing a communication connection with the external device using low-power wireless communication method, and wherein the performing of the communication connection comprises:

re-performing the communication connection with the external device based on the communication connection with the external device failing a specified number of times or less than the specified number of times; and identifying the external device as the foreign object based on the communication connection with the external device failing more than the specified number of times, and cutting off the transmission power.

12. The method of claim 9, wherein the detecting of the foreign object comprises:

stopping detection of the amount of change in DC voltage for detecting the foreign object based on a change in load of the power transmission circuit being detected;

receiving feedback information including stabilization information of a reception voltage of the external device periodically using low-power wireless communication method by a communication module; and identifying stabilization of the reception voltage of the external device based on the feedback information, and based on the load change being detected, re-detecting the amount of change in DC voltage for detecting the foreign object.

13. The method of claim 8, further comprising:

displaying notification information related to detection or removal of the foreign object to a display of the electronic device based on the foreign object being detected in the partial area of the exposed surface; and outputting notification information related to the detection or removal of the foreign object as an audio signal based on the foreign object being detected in the partial area of the exposed surface.

14. The method of claim 8, further comprising:

controlling a communication module to transmit notification information related to detection or removal of the foreign object to another electronic device based on the foreign object being detected in the partial area of the exposed surface; and receiving information related to the operation of the external device, and controlling the transmission power based on the information related to the operation of the external device, wherein the low-power wireless communication signal includes a beacon signal.

15. A non-transitory computer-readable storage medium storing a program, the program comprising executable instructions that, when executed by at least one processor of an electronic device, cause the electronic device to perform operations comprising:

converting, by a control circuit of the electronic device, transmission power into a direct current (DC) link voltage;

converting, by an inverter of the electronic device, the DC link voltage into alternating current (AC) voltage and output a high-frequency current to a resonance circuit of the electronic device configured for electromagnetic induction heating;

identifying whether an external device is present in a partial area of an externally exposed surface of the electronic device corresponding to the resonance circuit included in a power transmission circuit of the electronic device, based on a low-power wireless communication signal;

transmitting transmission power generated in the resonance circuit to the external device by applying the high-frequency current to the resonance circuit, based on the external device being present in the partial area of the exposed surface;

obtaining analog-to-digital converter samples in a half-wave rectified DC section of the DC link voltage; and identify that a foreign object is detected based on an average value of the analog-to-digital converter samples in the half-wave rectified DC section of the DC link voltage exceeding a specified threshold value.

* * * * *